United States Patent Office.

JOHN BUTLER, OF NEW YORK, N. Y.

Letters Patent No. 93,411, dated August 10, 1869.

IMPROVED COMPOUND OIL FOR PRODUCING GAS.

The Schedule referred to in these Letters Patent and making part of the same.

*To all whom it may concern:*

Be it known that I, JOHN BUTLER, of the city, county, and State of New York, have invented a new and improved Gas-Oil; and I do hereby declare that the following is a full, clear, and exact description thereof, which will enable others skilled in the art to make and use the same.

My invention has for its object to furnish an improved heavy-gravity compound oil, by compounding oils with crude resin, and which shall be particularly adapted to the manufacture of rich gas for lighting small towns, public buildings, dwellings, &c.; and It consists in the oil formed of the ingredients, in proportions and manner hereinafter more fully described.

In preparing this oil, I take three (3) parts of clean strained crude resin, one (1) part of thin Newbern tar, and one (1) part of virgin gum turpentine, and place them in a large cauldron, under which I keep up a slow fire, and stir them constantly, until they are thoroughly melted and amalgamated. All the dirt and other impurities are then carefully skimmed out with a skimmer. While the mixture is at a heat just below the vaporizing point, I add three (3) parts of crude paraffine, of the gravity of 28° Baumé, pouring it in slowly, and stirring it briskly, to thoroughly incorporate it with the other ingredients. The heat is then shut off, and when the oil is in a comparatively cool state, I add and stir in one (1) part of menhaden oil; and lastly, I add one (1) part of oil of turpentine. When cool, the oil is poured into packages through a strainer.

In this way an oil is produced which may be converted into gas in the ordinary manner, and from which fixed gas may be rapidly formed, of a quality rich in carbon, and which can yet be burned with medium-sized burners without smoke.

From this oil gas can be made at a lower decomposing heat than that absolutely necessary for the economical production of gas from paraffine and resin-oils, and at the same time the yield of fixed gas is largely increased from a given quantity, as compared with the oils generally used for such purposes.

By the use of this oil, the admixture of atmospheric air with the gas, to prevent smoking, is dispensed with, which mixing is too often unequally done, causing the mixed gas to be irregular and uncertain in its illuminating-power. And, at the same time, the danger from explosive gas, produced by mixing too large a proportion of air with the fixed gas, is wholly avoided.

Having thus described my invention,

I claim as new, and desire to secure by Letters Patent—

An improved gas-oil, compounded of the ingredients, and in about the proportions and manner substantially as herein described and set forth.

The above specification of my invention signed by me, this 1st day of July, 1869.

JOHN BUTLER.

Witnesses:
FRANK BLOCKLEY,
JAMES T. GRAHAM.